Nov. 6, 1956  T. A. MILLER  2,769,573
MOLD FILLING APPARATUS
Filed Sept. 22, 1954  2 Sheets-Sheet 1
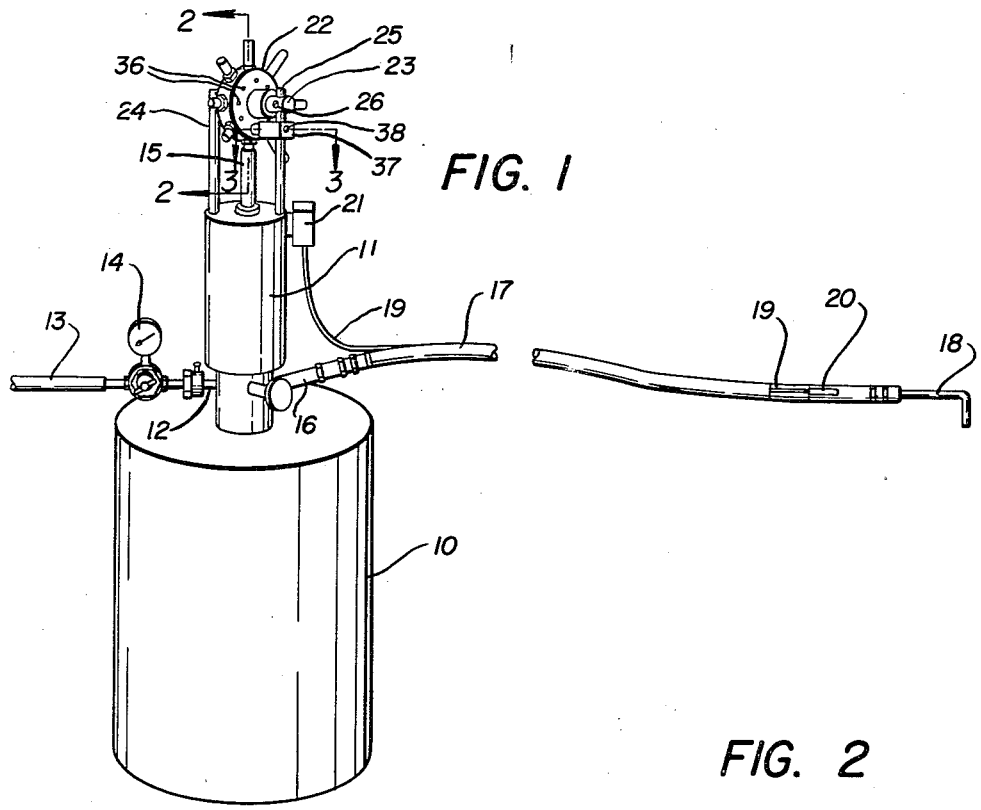
FIG. 1
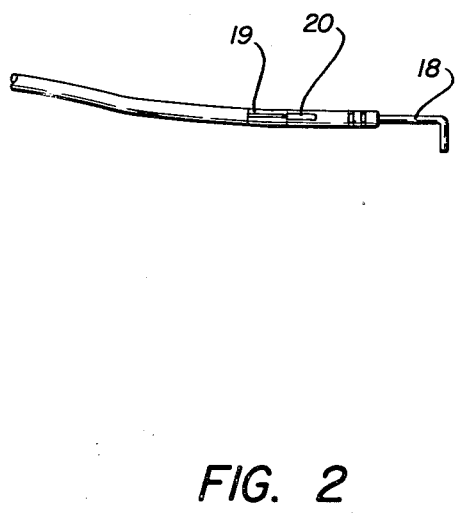
FIG. 2
FIG. 3
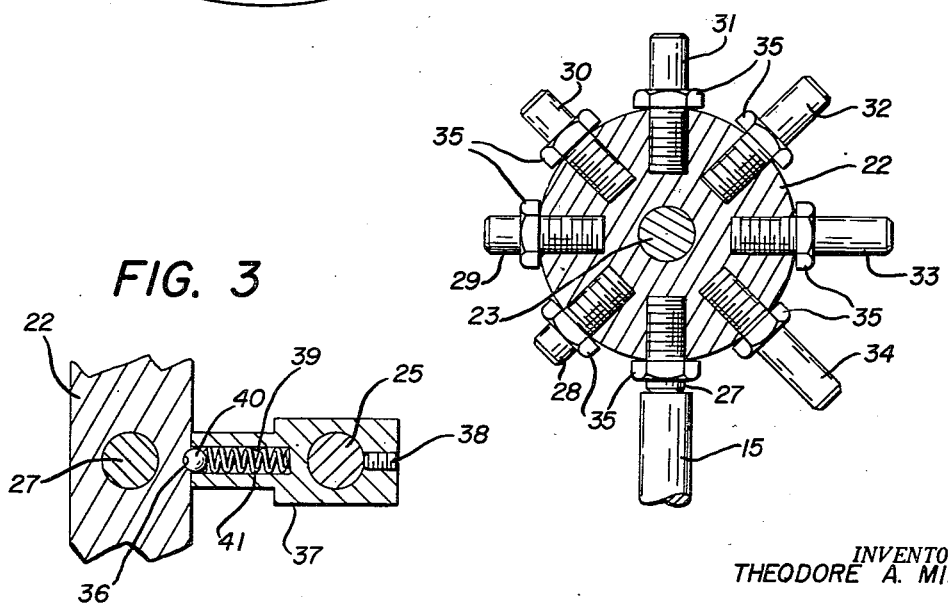
INVENTOR.
THEODORE A. MILLER
BY
Oldham & Oldham
ATTORNEYS

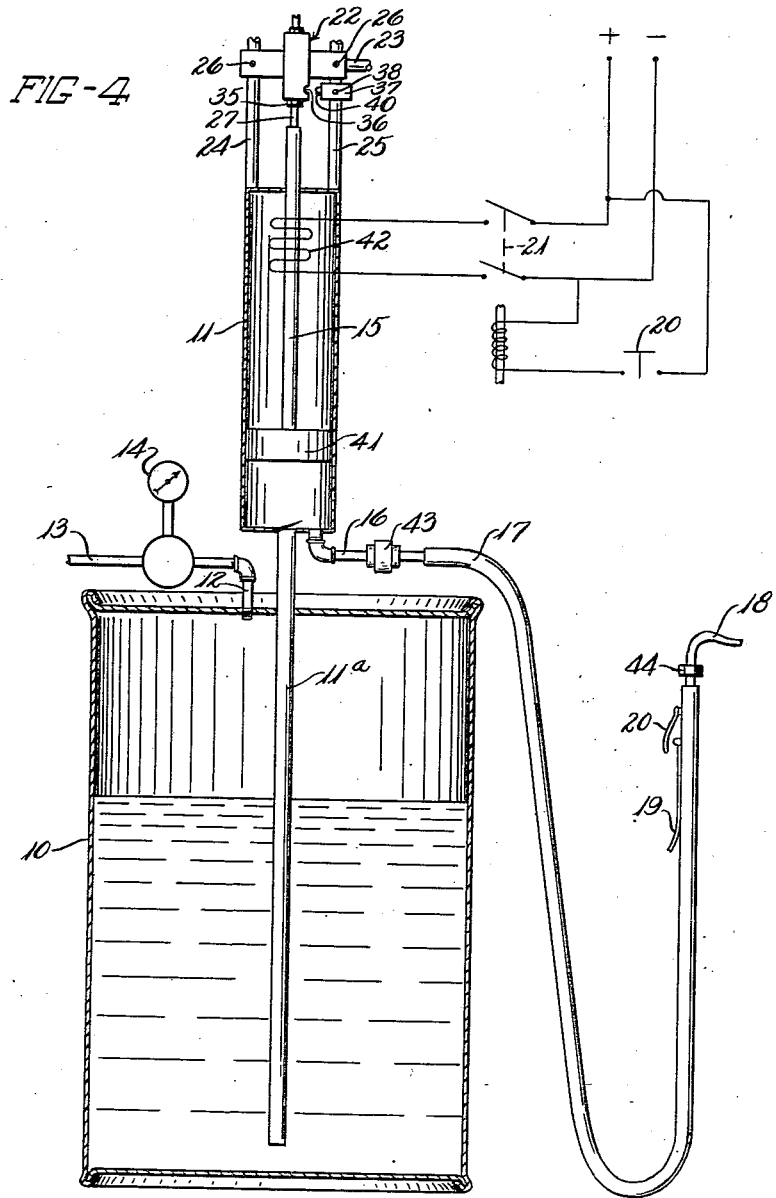

United States Patent Office 2,769,573
Patented Nov. 6, 1956

2,769,573
MOLD FILLING APPARATUS

Theodore A. Miller, Cuyahoga Falls, Ohio

Application September 22, 1954, Serial No. 457,685

3 Claims. (Cl. 222—43)

This invention relates to apparatus for delivering a measured quantity of liquid material to a mold cavity, and is especially useful in delivering a dispersion of thermosetting plastic material, such as plastisol, to a mold cavity.

In the manufacture of hollow plastic articles, it has been the practice to place a measured supply of plastisol or liquid thermosetting plastic in a mold cavity of the desired shape and size and to heat the mold while manipulating it to flow the liquid over the interior surface of the mold uniformly and to jell and thermoset the deposit so formed by continued heating and then cooling of the mold.

As the thickness of the wall of the article and the weight of the article are determined by the amount of liquid placed in the mold, it is important that the liquid deposited in the mold be accurately measured and the manufacture of such articles in continuous production requires repeated measuring of fixed quantities of different amounts to different molds in a minimum of time.

The present invention has for its principal object the rapid and accurate measurement of liquid mold charges and the delivery thereof directly to the mold cavity.

Another object is to provide quickly for changing from a charge of one amount to one of another amount.

Other objects are to prevent waste of material, to provide quick operation, and to prevent deterioration of the material.

These and other objects will appear from the following description, reference being had to the accompanying drawings.

Of the drawings:

Fig. 1 is a perspective view of the apparatus of the invention;

Fig. 2 is a cross-sectional view thereof, taken on line 2—2 of Fig. 1;

Fig. 3 is a sectional detail view taken on line 3—3 of Fig. 1.

Fig. 4 is a vertical cross-section view of the storage tank and measuring mechanism, including a wiring diagram of the relay and control switch circuit.

Referring to the drawings, which show an embodiment of the invention, the numeral 10 designates a normally closed drumlike storage tank for storing the liquid plastic material or plastisol. Mounted on the storage tank is a measuring and dispersing cylinder 11 having an intake pipe 11a extending to near the bottom of the storage tank, so as to be below the surface of the liquid stored therein at all times. An air connection 12 is provided on the storage tank connecting thereto at the top of the tank above the liquid therein, and is connected to a source such as a compressed air line 13. A gauge 14 on the air line determines the pressure in the tank. Presence of air upon the surface of the liquid forces the liquid to fill the measuring cylinder 11. Above the liquid in the cylinder is a piston 41 which is connected to a piston rod 15. A motor 42 is provided for lowering the piston against the pressure within the cylinder. The cylinder has a discharge connection 16 to which a flexible hose 17 is connected by a check valve 43 which prevents flow toward the cylinder. The hose terminates in a filling nozzle 18 which also has a check valve 44 to prevent undesirable dripping of liquid therefrom. The arrangement is such that with the tank charged with air under pressure, the piston and with it the rod 15 are raised to the highest position the piston may maintain and upon energizing of the motor the piston and rod are lowered against the fluid pressure, to discharge through the hose 17 a charge equal to the capacity of the cylinder.

For energizing the motor, a switch line 19 therefrom extends along the hose 17 to a switch 20 located on the hose at the nozzle. The switch line connects to a relay 21 which controls electric current to the motor.

When switch 21, which is a push button type, is released, it opens and the motor is deenergized, the piston 41 thereby returning to its raised position under pressure of the liquid in the intake pipe 11a.

For providing measurement of the charge and quick adjustment thereof, a turret 22 is rotatably mounted above the piston rod 15 on a shaft 23 secured adjustably to a pair of vertical support rods 24, 25 mounted on the cylinder 11. The shaft 23 has two cross holes to engage over the rods to which it is secured by set screws 26. A plurality of adjustable stops 27 to 34 project radially of the turret to engage and stop movement of piston rod 15. Each stop is threaded in a radial threaded opening in the turret and has a jamb nut 35 to lock it at any radial adjustment. The arrangement is such that any stop may be selected and aligned with the piston rod 15. The stops are preferably of graduated lengths.

For locking the turret with any stop aligned with the piston rod, a series of indentations 36 are formed in an end face of turret 22 in position to engage a friction ball lock 37 adjustably secured to rod 25 by a set screw 38. The ball lock has a bore 39 in which is retained a ball 40 and a compression spring 41. The arrangement is such that at any alignment of a stop with the piston rod 15, the ball 40 frictionally engages one of the indentations 36 to hold the turret against accidental movement.

In the operation of the apparatus, the set screws 26 and 38 are loosened and the shaft 23 is adjusted along the rods to a position where approximately the desired volumes of liquid will be delivered which are desired. The screws 26 are then tightened and the ball stop 37 aligned with the indentations of the turret. The ball stop is then secured by the set screw 38. The stops 27 to 34 are then adjusted by screwing them in and out of the turret until the exact volume desired is delivered as each stop is aligned with the piston rod. The jamb nuts 35 are then tightened and the apparatus is ready to use. Each stop is set to deliver the correct amount to a particular mold cavity and as successive molds are to be filled, the apparatus will deliver the correct amount to each mold. When changing molds, it is necessary only to rotate the turret to the correct position to provide the desired stop.

As each mold cavity is presented for filling, the operator holds the filling nozzle 18 over the cavity and presses the switch 20 to close it, whereupon, the motor is energized and piston is depressed to discharge the desired amount of liquid as determined by the volume of the cylinder as limited by the setting of the stop. Upon release of switch 20, the piston is raised by pressure of the liquid until its rod engages the stop and is ready for the next operation.

The apparatus is accurate and eliminates waste of material and time while promoting fast filling of the molds.

Variations may be made, without departing from the spirit and scope of the invention, as it is defined by the following claims.

I claim:
1. Mold filling apparatus, comprising a storage tank for containing a liquid molding material, a measuring cylinder having an inlet communicating with the liquid in the tank, means for applying fluid pressure to the liquid in said tank to force it into said cylinder, a piston in said cylinder and having a piston rod and adjustable stop means limiting movement of said piston rod under pressure of the liquid, said stop means comprising a turret having a plurality of projecting stops engageable with said piston rod, means mounting said turret on said measuring cylinder with the turret axis lying in, but perpendicular to, the path of said piston rod, and power means for moving said piston from said stop means against pressure of the fluid, to deliver a measured charge from said cylinder.

2. Mold filling apparatus, comprising a storage tank for containing a liquid molding material, a measuring cylinder having an inlet communicating with the liquid in the tank, means for applying fluid pressure to the liquid in said tank to force it into said cylinder, a piston in said cylinder and having a piston rod and adjustable stop means limiting movement of said piston rod under pressure of the liquid, said stop means comprising a turret having a plurality of projecting stops engageable with said piston rod, means mounting said turret on said measuring cylinder with the turret axis lying in, but perpendicular to, the path of said piston rod, said stops each being adjustably mounted on said turret, and power means for moving said piston from said stop means against pressure of the fluid to deliver a measured charge from said cylinder.

3. Mold filling apparatus, comprising a storage tank for containing a liquid molding material, a measuring cylinder having an inlet communicating with the liquid in the tank, means for applying fluid pressure to the liquid in said tank to force it into said cylinder, a piston in said cylinder and having a piston rod and adjustable stop means limiting movement of said piston rod under pressure of the liquid, said stop means comprising a turret having a plurality of projecting stops engageable with said piston rod, means mounting said turret on said measuring cylinder with the turret axis lying in, but perpendicular to, the path of said piston rod, said stops each being screw threaded to adjustably engage said turret, and power means for moving said piston from said stop means against pressure of the fluid, to deliver a measured charge from said cylinder.

References Cited in the file of this patent

UNITED STATES PATENTS

| | | |
|---|---|---|
| 1,339,237 | Thompson | May 4, 1920 |
| 1,449,218 | Davis | Mar. 20, 1923 |
| 1,551,217 | Rudolph et al. | Aug. 25, 1925 |
| 1,640,509 | Lowe | Aug. 30, 1927 |
| 1,702,446 | Lucas et al. | Feb. 19, 1929 |
| 1,748,044 | Huber | Feb. 18, 1930 |
| 1,871,989 | Heitger | Aug. 16, 1932 |
| 2,294,705 | Wedeberg | Sept. 1, 1942 |
| 2,365,196 | Honegger | Dec. 19, 1944 |
| 2,370,383 | Wallace et al. | Feb. 27, 1945 |
| 2,689,067 | Freeman | Sept. 14, 1954 |